United States Patent
Huang et al.

(10) Patent No.: US 12,461,027 B2
(45) Date of Patent: Nov. 4, 2025

(54) DETECTION METHOD AND DETECTION DEVICE FOR DISPLAY SCREEN

(71) Applicants: Chongqing BOE Display Technology Co., Ltd., Chongqing (CN); BOE Technology Group Co., Ltd., Beijing (CN)

(72) Inventors: Can Huang, Beijing (CN); Hongcheng Gao, Beijing (CN); Jiandong Bao, Beijing (CN); Dawei Shi, Beijing (CN); Lu Yang, Beijing (CN); Wentao Wang, Beijing (CN); Weitao Ma, Beijing (CN)

(73) Assignees: Chongqing BOE Display Technology Co., Ltd., Chongqing (CN); Beijing BOE Technology Development Co., Ltd., Beijing (CN)

( * ) Notice: Subject to any disclaimer, the term of this patent is extended or adjusted under 35 U.S.C. 154(b) by 317 days.

(21) Appl. No.: 18/042,857

(22) PCT Filed: Aug. 24, 2021

(86) PCT No.: PCT/CN2021/114229
§ 371 (c)(1),
(2) Date: Feb. 24, 2023

(87) PCT Pub. No.: WO2022/042521
PCT Pub. Date: Mar. 3, 2022

(65) Prior Publication Data
US 2024/0027343 A1    Jan. 25, 2024

(30) Foreign Application Priority Data
Aug. 31, 2020   (CN) .......................... 202010900699.2

(51) Int. Cl.
*G01N 21/47* (2006.01)
*H10K 71/70* (2023.01)

(52) U.S. Cl.
CPC ......... *G01N 21/4738* (2013.01); *H10K 71/70* (2023.02)

(58) Field of Classification Search
CPC ..... G01N 21/4738; H10K 71/70; G01J 3/504; G01J 3/506; G01M 99/005; G01M 11/02
See application file for complete search history.

(56) References Cited

U.S. PATENT DOCUMENTS

| | | | |
|---|---|---|---|
| 2002/0080307 A1* | 6/2002 | Kuroiwa | G02F 1/1309 349/96 |
| 2012/0287168 A1* | 11/2012 | Botzas | G09G 3/3426 345/102 |
| 2015/0166400 A1* | 6/2015 | Yamamoto | C03C 3/095 428/410 |

FOREIGN PATENT DOCUMENTS

| | | | | |
|---|---|---|---|---|
| CN | 1354360 A | * | 6/2002 | ........... G02F 1/1309 |
| CN | 101242476 B | * | 9/2010 | ............... H04N 1/62 |

(Continued)

*Primary Examiner* — Mohamed K Amara
(74) *Attorney, Agent, or Firm* — Westman, Champlin & Koehler, P.A.

(57) ABSTRACT

A detection method for a display screen is provided, including: emitting, by a light source, light onto a surface of a display screen to form a diffuse reflection, where the light source includes an initial first color channel value a1 and an initial second color channel value b1; measuring, by a detector, a first color channel value a and a second color channel value b of the reflected light; calculating a color breakup value $l_{ab}$ of the reflected light by: $l_{ab} = \sqrt{(a-a1)^2 + (b-b1)^2}$; calculating, in response to (a+b) being not equal to 0, a hue value $\varepsilon$ by: $\varepsilon = |a+b|/(a+b)$; calculating a color breakup and hue quantization value $\varphi$ of the reflected light by: $\varphi = l_{ab} \times \varepsilon = |a+b|\sqrt{(a-a1)^2 + (b-b1)^2}/(a+b)$; and determining whether the display screen is qualified based on (Continued)

determining whether the color breakup and hue quantization value $\varphi$ is within a predetermined quantization value range.

20 Claims, 11 Drawing Sheets

(56) References Cited

FOREIGN PATENT DOCUMENTS

| | | | | | |
|---|---|---|---|---|---|
| CN | 101840671 | A | * | 9/2010 | ............... G09G 3/36 |
| CN | 104412089 | A | * | 3/2015 | ........... G02F 1/1309 |
| CN | 108136201 | A | * | 6/2018 | ............. H04N 23/88 |
| CN | 109752394 | A | * | 5/2019 | |
| CN | 111108602 | A | * | 5/2020 | ......... H10K 59/8792 |
| DE | 69925652 | T2 | * | 3/2006 | ................ G01J 3/46 |
| JP | 2021073820 | A | * | 5/2021 | ............. G01B 11/14 |
| WO | WO-2016042907 | A1 | * | 3/2016 | ........... G09G 3/3607 |

\* cited by examiner

DETECTION METHOD AND DETECTION DEVICE FOR DISPLAY SCREEN

CROSS REFERENCE TO RELATED APPLICATION(S)

This application is a Section 371 National Stage Application of International Application No. PCT/CN2021/114229, filed on Aug. 24, 2021, entitled "DETECTION METHOD AND DETECTION DEVICE FOR DISPLAY SCREEN", which published as WIPO Publication No. 2022/042521 A1, on Mar. 3, 2022, not in English, which claims priority to Chinese Patent Application No. 202010900699.2, filed on Aug. 31, 2020, the disclosures of which are incorporated herein by reference in their entireties.

TECHNICAL FIELD

The present disclosure relates to a field of display technology, in particular, to a method and a device for detecting a display screen, and more specifically, to a quantitative evaluation method for a color breakup and a hue of light reflected by a display screen in an off state.

BACKGROUND

When an ambient light is incident to a display screen, such as an LCD display screen, an OLED display screen, etc., reflected light may have a color breakup, which may affect the user experience of the display screen. At present, no quantitative evaluation method is provided for the above color breakup, and a degree of the color breakup may only be roughly determined by a vision of an inspector.

SUMMARY

Some embodiments of the present disclosure provide a method for detecting a display screen, including: emitting, by a light source, light onto a surface of a display screen to form a diffuse reflection, where the light source includes an initial first color channel value a1 and an initial second color channel value b1; measuring, by a detector, a first color channel value a and a second color channel value b of the reflected light by using a detector; calculating a color breakup value $l_{ab}$ of the reflected light by: $l_{ab}=\sqrt{(a-a1)^2+(b-b1)^2}$; calculating, in response to (a+b) being not equal to 0, a hue value $\varepsilon$ by: $\varepsilon=|a+b|/(a+b)$; calculating a color breakup and hue quantization value $\varphi$ of the reflected light by: $\varphi=l_{ab}\times\varepsilon=|a+b|\sqrt{(a-a1)^2+(b-b1)^2}/(a+b)$; and determining whether the display screen is qualified based on determining whether the color breakup and hue quantization value $\varphi$ is within a predetermined quantization value range.

In some embodiments, the detection method further incudes: determining, in response to (a+b) being equal to 0, whether the display screen is qualified based on determining whether the color breakup value $l_{ab}$ of the reflected light is within a predetermined color breakup value range.

In some embodiments, the calculating a color breakup and hue quantization value $\varphi$ of the reflected light includes calculating a plurality of color breakup and hue quantization values the detection method further includes: calculating an average value $\varphi_{average}$ of the plurality of color breakup and hue quantization values $\varphi$; and the determining whether the display screen is qualified based on determining whether the color breakup and hue quantization value $\varphi$ is within a predetermined quantization value range includes: determining whether the display screen is qualified based on determining whether the average value $\varphi_{average}$ is within the predetermined quantization value range.

In some embodiments, the calculating a color breakup and hue quantization value $\varphi$ of the reflected light includes calculating a plurality of color breakup and hue quantization values the detection method further includes: determining a maximum value $\varphi_{max}$ from the plurality of color breakup and hue quantization values $\varphi$; and the determining whether the display screen is qualified based on determining whether the color breakup and hue quantization value $\varphi$ is within a predetermined quantization value range includes: determining whether the display screen is qualified based on determining whether the maximum value $\varphi_{max}$ is within the predetermined quantization value range.

In some embodiments, the light source is a point light source, and the display screen includes at least one test point located on the surface of the display screen; the emitting, by a light source, light onto a surface of a display screen includes: emitting, by the point light source, light onto the at least one test point; the measuring, by a detector, a first color channel value a and a second color channel value b of the reflected light includes: for each test point, rotating the detector around the test point in a plane perpendicular to the display screen, so as to obtain a plurality of measurement positions, where the point light source and the test point are located in the plane; and obtaining, by the detector, the first color channel values a and the second color channel values b of the reflected light at the plurality of measurement positions, respectively; the calculating a plurality of color breakup and hue quantization values $\varphi$ includes: respectively calculating the color breakup and hue quantization values $\varphi$ for the first color channel values a and the second color channel values b of the reflected light at the plurality of measurement positions, so as to obtain the plurality of color breakup and hue quantization values $\varphi$.

In some embodiments, the light emitted by the point light source is incident on the display screen at an incident angle of 30° to 60°.

In some embodiments, the at least one test point includes a plurality of test points distributed in a matrix, and a center of the matrix coincides with a center of the display screen.

In some embodiments, an orthographic projection of an incident path of the light emitted by the point light source to the display screen on the display screen is parallel to, perpendicular to, or at a predetermined acute angle with respect to a length direction of the display screen.

In some embodiments, the light source is a line light source parallel to the display screen, the display screen includes at least one test line on the surface of the display screen, and each test line includes a plurality of test points; the emitting, by a light source, light onto a surface of a display screen comprises: emitting, by the line light source, light onto the at least one test line; the measuring, by a detector, a first color channel value a and a second color channel value b of the reflected light comprises: for each test line, moving the detector in a direction parallel to an extension direction of the test line; and for each test point on each test line, rotating the detector around the test point in a plane perpendicular to the test line comprising the test point, so as to obtain a plurality of measurement positions, where the test point is located in the plane; and obtaining, by the detector, the first color channel values a and the second color channel values b of the reflected light at the plurality of measurement positions, respectively; the calculating a plurality of color breakup and hue quantization values $\varphi$ includes: respectively calculating the color breakup and hue quantization values φ for the first color channel values a and the second color channel values b of the reflected light at the plurality of measurement positions, so as to obtain the plurality of color breakup and hue quantization values φ.

In some embodiments, the light emitted by the line light source is incident on the display screen at an incident angle of 30° to 60°.

In some embodiments, the at least one test line includes a plurality of test lines parallel to each other and distributed evenly on the display screen.

In some embodiments, the test line is parallel to, perpendicular to, or at a predetermined acute angle with respect to a length direction of the display screen.

In some embodiments, the light source is a surface light source parallel to the display screen, and an orthographic projection of a center of the surface light source on the display screen coincides with a center of the surface of the display screen; the emitting, by a light source, light onto a surface of a display screen comprises: emitting, by the surface light source, light onto an entire surface of the display screen; the measuring, by a detector, a first color channel value a and a second color channel value b of the reflected light includes: rotating the detector around a straight line connecting the center of the surface light source and the center of the surface of the display screen in a plane parallel to the surface of the display screen, so as to obtain a plurality of rotation positions; and for each rotation position, rotating the detector around the center of the surface of the display screen in a plane perpendicular to the display screen, so as to obtain a plurality of measurement positions, where the rotation position and the center of the surface of the display screen are located in the plane perpendicular to the display screen; and obtaining, by the detector, the first color channel values a and the second color channel values b of the reflected light at the plurality of measurement positions, respectively; the calculating a plurality of color breakup and hue quantization values φ includes: respectively calculating the color breakup and hue quantization values φ for the first color channel values a and the second color channel values b of the reflected light at the plurality of measurement positions, so as to obtain the plurality of color breakup and hue quantization values φ.

In some embodiments, the light source is a mixed-color light source including at least two different colors.

In some embodiments, the light source is a white light source.

Some embodiments of the present disclosure provide a device for detecting a display screen, including: a light source configured to emit light onto a surface of a display screen to form a diffuse reflection, where the light source includes an initial first color channel value a1 and an initial second color channel value b1; a detector configured to measure a first color channel value a and a second color channel value b of the reflected light; and a processor configured to perform each step of the detection methods described in the aforementioned embodiments.

Some embodiments of the present disclosure provide a system for detecting a display screen, including the detection device described in the aforementioned embodiments, and a display screen.

In some embodiments, the display screen includes an OLED display panel, and the OLED display panel includes: a substrate; a plurality of pixels arranged in an array on the substrate; an encapsulation layer located on a side of the plurality of pixels away from the substrate and covering the plurality of pixels; and a color film layer arranged on a side of the encapsulation layer away from the plurality of pixels.

BRIEF DESCRIPTION OF THE DRAWINGS

By reading detailed descriptions of non-limiting embodiments with reference to the accompanying drawings, other features, objectives, and advantages of the present disclosure will become more apparent.

DETAILED DESCRIPTION OF EMBODIMENTS

Figure 1:
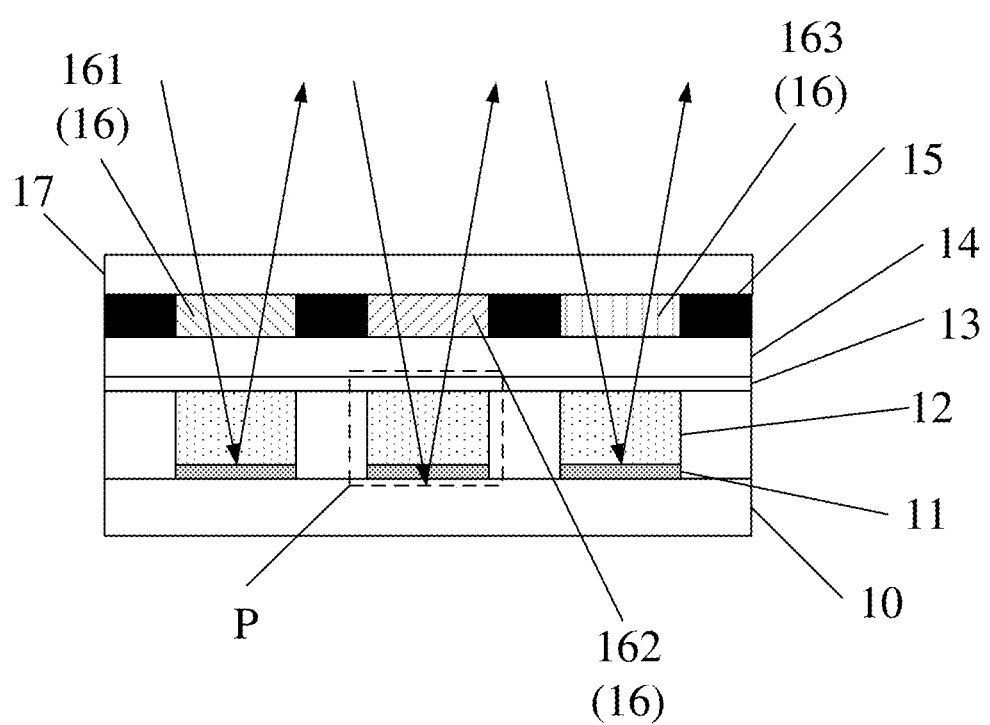
FIG. 1 shows a schematic diagram of an OLED display structure using a COE technology according to some embodiments of the present disclosure.

The present disclosure will be further described in detail below with reference to the drawings and embodiments. It may be understood that the specific embodiments described here are merely used to explain the related invention, but not to limit the present disclosure. In addition, it should be noted that, for ease of description, only the parts related to the present disclosure are shown in the drawings.

It should be noted that, in a case of no conflict, embodiments in the present disclosure and features in the embodiments may be combined with each other.

In addition, in the following detailed description, for ease of explanation, many specific details are set forth to provide a comprehensive understanding of the embodiments of the present disclosure. Obviously, however, one or more embodiments may also be implemented without these specific details.

It should be understood that, although terms "first," "second" and so on may be used herein to describe different elements, these elements should not be limited by these terms. These terms are merely used to distinguish one element from another element. For example, without departing from the scope of exemplary embodiments, a first element may be named as a second element, and similarly, the second element may be named as the first element. The term "and/or" used herein includes any and all combinations of one or more related listed items.

It should be understood that when an element or layer is referred to as being "formed on" another element or layer, the element or layer may be directly or indirectly formed on the other element or layer. That is, for example, an intermediate element or an intermediate layer may be provided. In contrast, when an element or layer is referred to as being "directly formed on" another element or layer, no intermediate element or layer is provided. Other terms used to describe a relationship between elements or layers (for example, "between" and "directly between", "adjacent to" and "directly adjacent to", etc.) should be interpreted in a similar manner.

The terms used herein are merely for describing specific embodiments, and are not intended to limit the embodiments. As used herein, unless otherwise specified in the context, a singular form is also intended to include a plural form. It should also be understood that when terms "comprising" and/or "including" are used herein, it means that the described features, wholes, steps, operations, elements and/or components are provided, but do not exclude the presence or addition of one or more other features, wholes, steps, operations, elements, components and/or combinations thereof.

Here, unless otherwise specified, expressions "located in the same layer" and "arranged in the same layer" generally mean that a first component and a second component may be formed of the same material and may be formed by the same patterning process. The expressions "located in different layers" and "arranged in different layers" generally mean that the first component and the second component are formed by different patterning processes.

In an OLED display panel in a related art, a layer of polarizer (POL) is attached on a light output side of the OLED display panel in order to prevent a screen reflection. However, the polarizer has a low transmittance, resulting in a high-power consumption of the OLED display panel. In order to improve a light extraction efficiency, a COE (color film on encapsulation) technology has become a research hotspot in recent years. FIG. 1 shows a schematic diagram of an OLED display structure using the COE technology according to some embodiments of the present disclosure. As shown in FIG. 1, a display panel used as a display screen includes a substrate 10 and pixels P arranged in an array on the substrate 10. Each pixel P includes a first electrode 11, a light-emitting functional layer 12, and a second electrode 13, which are arranged away from the substrate in sequence. The first electrode 11 may be, for example, an anode, which may be made of a metal material. The light-emitting functional layer 12 may include, for example, a hole injection layer, a hole transport layer, a light-emitting layer, an electron transport layer, and an electron injection layer, which are arranged away from the first electrode 11 in sequence. The display panel further includes an encapsulation layer 14, which covers the pixels P on the substrate 10. Color film layers 16 arranged in an array are provided on the encapsulation layer 14, including a first color film layer 161, a second color film layer 162, and a third color film layer 163. The first color film layer 161, the second color film layer 162, and the third color film layer 163 may be, for example, a red color film layer, a green color film layer, and a blue color film layer, respectively. Each color film layer corresponds to a pixel P, for example, an orthographic projection of the color film layer 16 on the substrate 10 falls within an orthographic projection of a corresponding pixel P on the substrate 10, or coincides with the orthographic projection of the corresponding pixel P on the substrate 10. A black matrix 15 is provided between adjacent color film layers 16. The display panel further includes a protection layer 17 disposed on a side of the black matrix 15 and the color film layer 16 away from the substrate 10. When ambient light is incident on a light output surface of the display panel (i.e., the display screen), the ambient light enters the display panel and is reflected by the first electrode 11 of the pixel P, and then the reflected light exits the display panel. Since a transmittance of the color film layer 16 is greater than that of the polarizer, an OLED display panel using the COE technology may have a more obvious screen reflection than an OLED display panel using POL. Moreover, since the color film layers 16, which are arranged in an array, are aligned with the pixels P and surrounded by the black matrix 15, a pinhole diffraction may occur when the ambient light is reflected by the first electrode 11, which may aggravate the color breakup (that is, a colored reflected light appears). The color breakup occurs in traditional LCD and POL-attached OLED products, but there is no quantitative standard for measurement, and testing methods are also lacking. Generally, a degree of the color breakup is roughly determined only by a vision of an inspector. Especially for the OLED display panel using the COE technology, the color breakup caused by the ambient light incident to the surface is more serious. It is necessary to design a quantifiable evaluation method to control the degree of color breakup and the reflection hue of the display screen, so as to improve the customer satisfaction.

Figure 2:
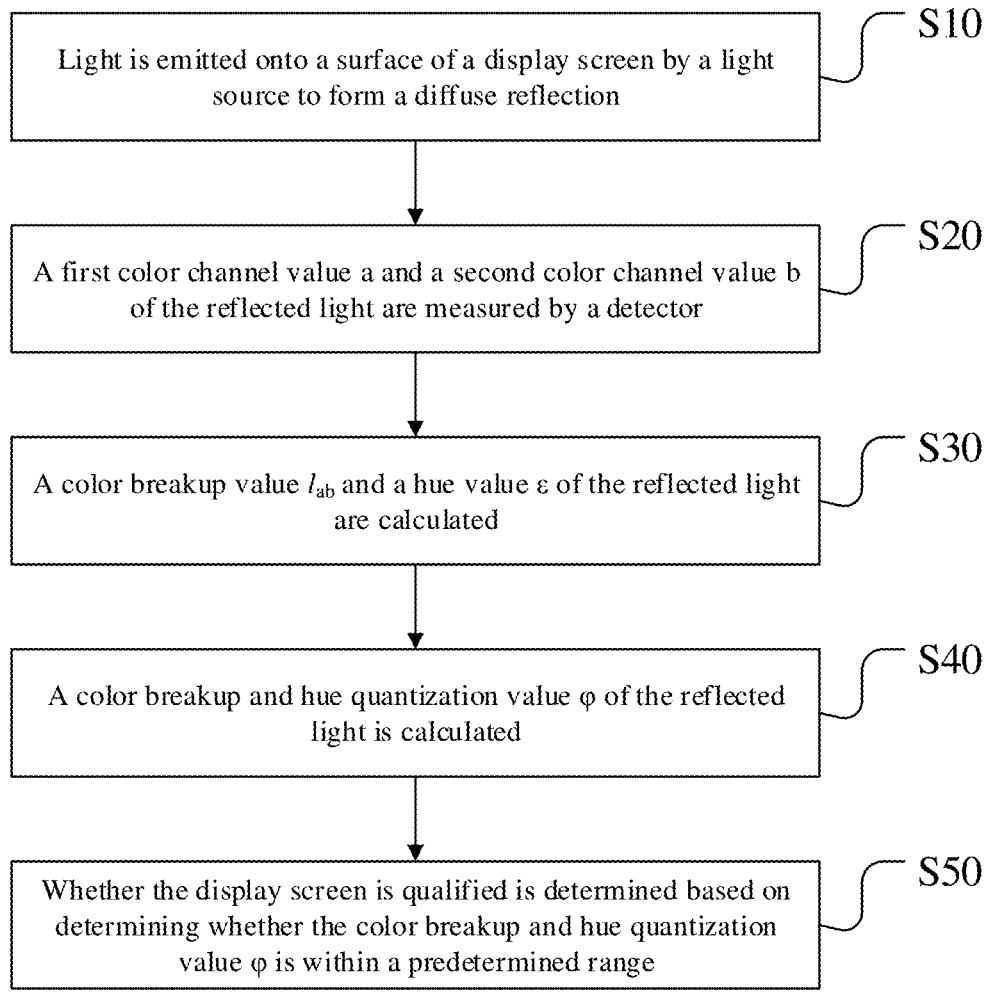
FIG. 2 shows a flowchart of a quantitative evaluation method for a color breakup and a hue of reflected light according to some embodiments of the present disclosure.

Some embodiments of the present disclosure provide a method for detecting a display screen, specifically a quantitative evaluation method for a color breakup and a hue of reflected light. FIG. 2 shows a flowchart of a quantitative evaluation method for a color breakup and a hue of reflected light according to some embodiments of the present disclosure. As shown in FIG. 2, the quantitative evaluation method for the color breakup and the hue of the reflected light includes the following steps S10 to S50.

In S10, light is emitted onto a surface of a display screen by a light source to form a diffuse reflection, and the light source includes an initial first color channel value a1 and an initial second color channel value b1.

In S20, a first color channel value a and a second color channel value b of the reflected light are measured by a detector.

In S30, a color breakup value $l_{ab}$ of the reflected light is calculated by: $l_{ab}=\sqrt{(a-a1)^2+(b-b1)^2}$, and a hue value ε of the reflected light is calculated by: $\varepsilon=|a+b|/(a+b)$.

In S40, a color breakup and hue quantization value φ of the reflected light is calculated by: $\varphi=l_{ab}\times\varepsilon=|a+b|\sqrt{(a-a1)^2+(b-b1)^2}/(a+b)$.

In S50, whether the display screen is qualified is determined based on determining whether the color breakup and hue quantization value φ is within a predetermined range.

The above embodiments are applicable to a case that (a+b) is not equal to 0. In other embodiments, when (a+b) is equal to 0, whether the display screen is qualified may be determined based on determining whether the color breakup value $l_{ab}$ of the reflected light is within a predetermined color breakup value range.

A principle and a specific operation of the quantitative evaluation method for the color breakup and the hue of the reflected light will be described in detail below.

Figure 3:
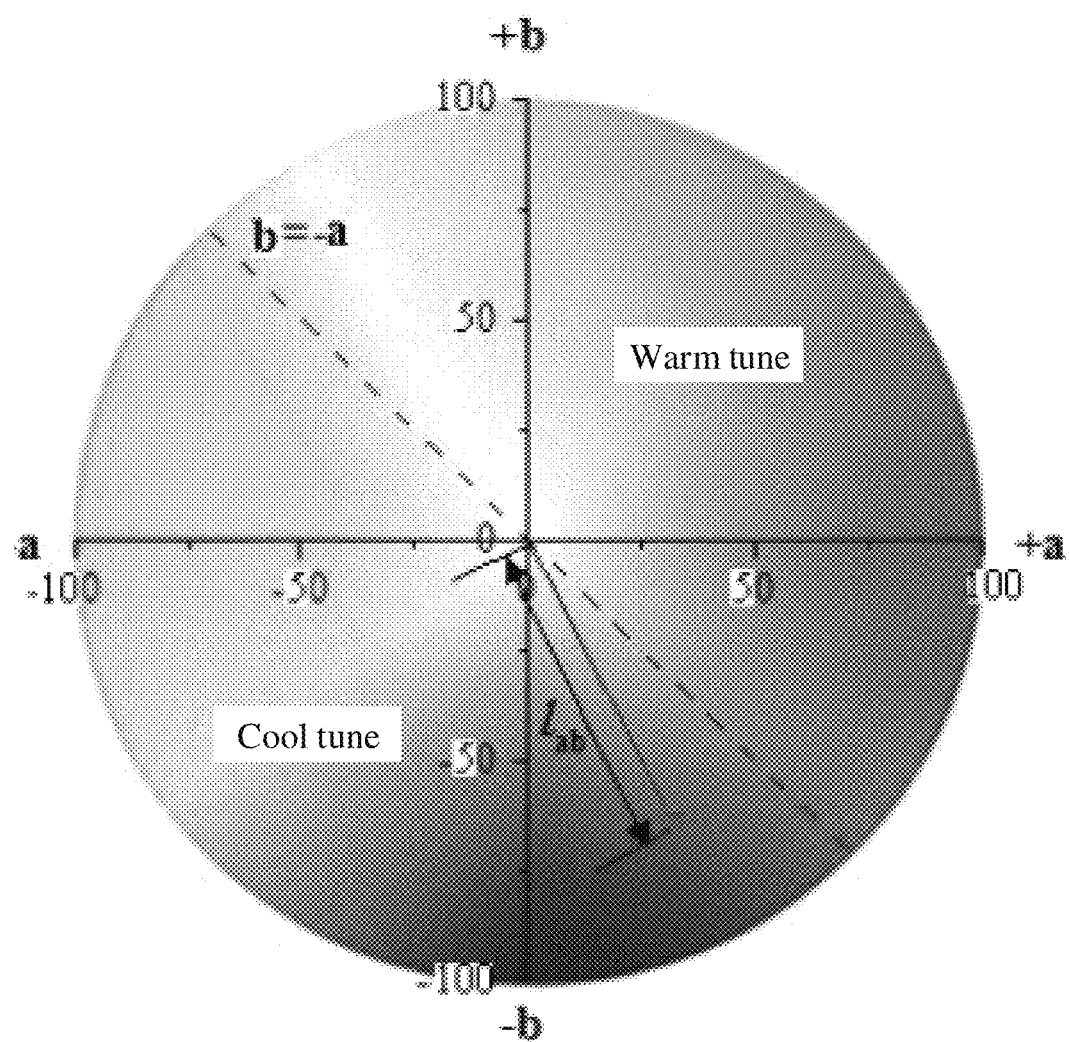
FIG. 3 shows a top view of a Lab color space.

FIG. 3 shows a top view of a Lab color space. As shown in FIG. 3, an abscissa a represents the first color channel value, where a positive direction of the abscissa a indicates red, and a negative direction of the abscissa a indicates green. An ordinate b represents the second color channel value, where a positive direction of the ordinate b indicates yellow, and a negative direction of the ordinate b indicates blue. Cool tones and warm tones may be divided by a straight line: b=−a, where the cool tones are located on a lower left side, and the warm tones are located on an upper right side. A color information of the light may be measured completely by using that plane coordinate system. In the top view of the Lab color space, only the first color channel value a and the second color channel value b which represent colors are involved, and an L value which represents brightness is not involved. In the present disclosure, a severity of the color breakup is quantified and measured by using $l_{ab}$, and the equation $l_{ab}=\sqrt{(a-a1)^2+(b-b1)^2}$ mathematically means a distance from a color coordinate point to the color coordinate of the light source, as shown in FIG. 3. The hue is represented by a value ε, where ε=|a+b|/(a+b). If ε=1, it means that the color coordinate (a, b) falls on the upper right side of the line b=−a, then the hue is a warm tone; if ε=−1, it means that the color coordinate (a, b) falls on the lower left side of the line b=−a, then the hue is a cool tone.

It should be noted that the incident light source in such embodiments may be a mixed-color light source including at least two different colors, and the color coordinate of the mixed-color light source may be (a1, b1). For example, the light source may be a white light source, the first color channel value a1 of the white light source is about 0, and the second color channel value b1 of the white light source is about 0, then the color coordinate of the white light source may be regarded as (0, 0).

In the present disclosure, $l_{ab}$ and ε are combined to define a product $\varphi=l_{ab}\times\varepsilon=|a+b|\sqrt{(a-a1)^2+(b-b1)^2}/(a+b)$, to quantitatively reflect both the color breakup and the hue. In this way, the color breakup and the hue of the reflected light by the display screen may be quantitatively evaluated. That is, a positive or negative value of φ indicates a hue information, where the positive value of φ indicates that the reflected light is a warm color light, and the negative value of φ indicates that the reflected light is a cool color light. A magnitude of the φ value indicates a degree of the color breakup, and the larger the φ value, the more serious the color breakup. In practical applications, it is only needed to set a predetermined range for the φ value, so that the color breakup and the hue of the reflected light by the display screen may be both quantitatively controlled. For example, a range of −N<φ<N is set, where N is an upper limit value that is set according to product requirements. The range may be [0, 128], so that the severity of the color breakup may be controlled within a range less than N. It is also possible to set a range of −N<φ<0, or a range of 0<φ<N, so that the hue may also be controlled to ensure that the reflected light by the product is a cool color light or a warm color light, and that the severity of the color breakup is within the range less than N.

In the following embodiments, the incident light source being a white light source is taken as an example for explanation. In this case, there is $l_{ab}=\sqrt{a^2+b^2}$ and $\varphi=|a+b|\sqrt{a^2+b^2}/(a+b)$.

Figure 4:
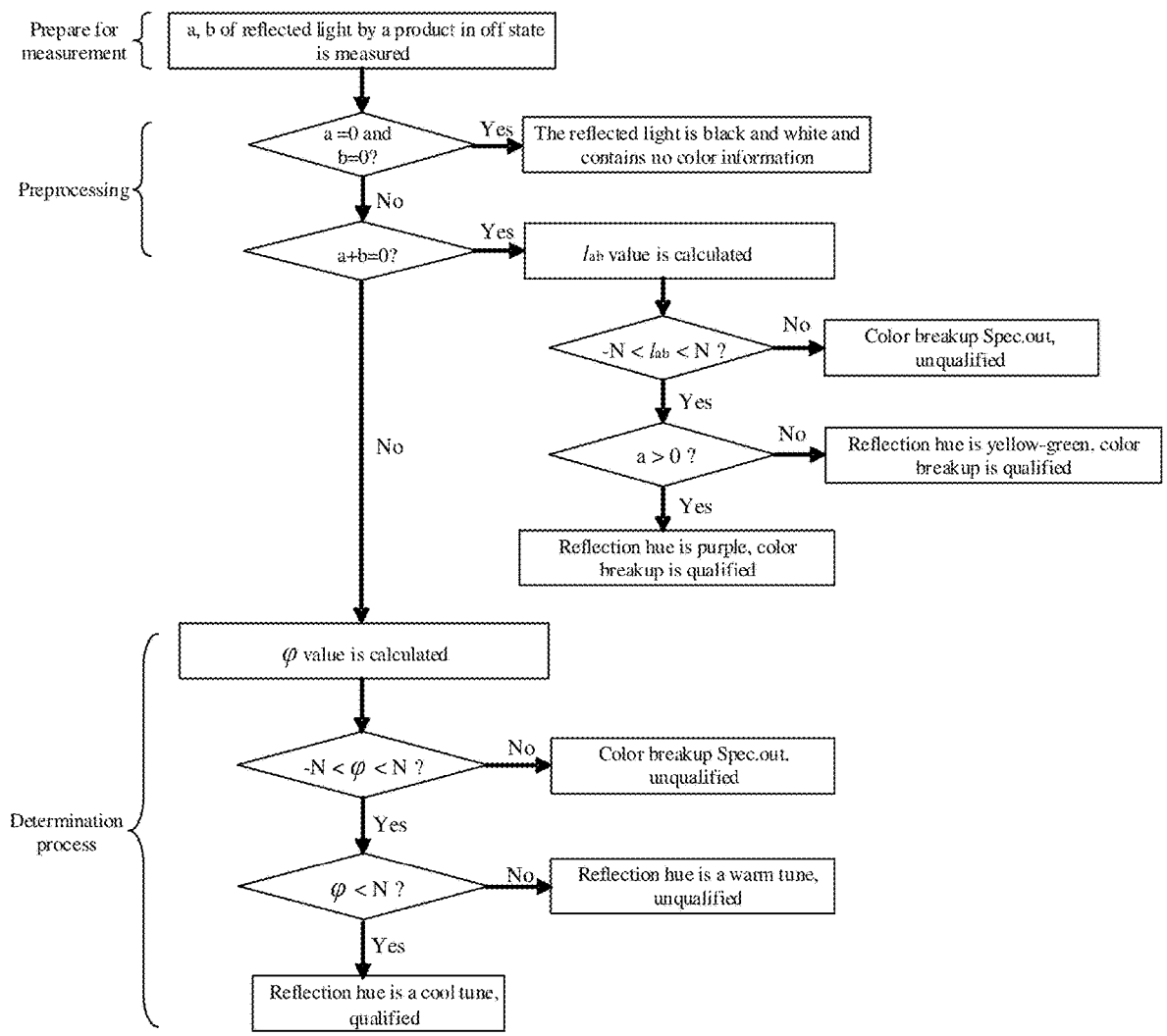
FIG. 4 shows a flowchart of measuring and determining a color breakup and a hue of reflected light at a single measurement position according to some embodiments of the present disclosure.

A single measurement position is illustrated by way of example in describing the quantitative evaluation method for the color breakup and the hue of the reflected light. FIG. 4 shows a flowchart of measuring and determining a color breakup and a hue of reflected light at a single measurement position according to some embodiments of the present disclosure. In this example, it is stipulated that the product requirements are met when the color breakup is controlled within N and the reflected light is of a cool tone.

As shown in FIG. 4, the reflected light by the display screen is first measured in an off state of the screen. Specifically, the light is emitted onto the display screen in the off state by a light source, and a first color channel value a and a second color channel value b of the reflected light by the display screen in a Lab color space is measured by a detector at a single measurement position.

Then, in a preprocessing stage, it is determined whether a is 0 and whether b is 0. If the result is yes, that is, a is equal to 0 and b is equal to 0, the reflected light measured at the single measurement position does not include a color information, and both the color breakup and the hue are qualified. If the result is no, it is determined whether (a+b) is equal to 0. If (a+b) is equal to 0, the color breakup value $l_{ab}$ of the reflected light is calculated by: $l_{ab}=\sqrt{a^2+b^2}$. When the color breakup value $l_{ab}$ exceeds the range of $-N\le l_{ab}\le N$, it is determined that the color breakup of the reflected light measured at the single measurement position is unqualified. When $l_{ab}$ falls into the range of $-N\le l_{ab}\le N$, it is determined that the color breakup of the reflected light measured at the single measurement position is qualified. In this case, it may be further determined whether a is greater than 0. If so, it may be determined that the hue of the reflected light with the qualified color breakup is yellow-green, or if not, it may be determined that the hue of the reflected light with the qualified color breakup is purple.

The above preprocessing stage is provided for a quantitative evaluation of the color breakup and the hue of the reflected light in a special case where the first color channel value a and the second color channel value b of the reflected light are measured at a single measurement position. In general, a, b, and (a+b) of the measured reflected light are not 0. The above-mentioned preprocessing stage is to eliminate the above-mentioned special case and avoid problems in a subsequent numerical calculation.

In general, based on the equation $\varphi=|a+b|\sqrt{a^2+b^2}/(a+b)$, the φ value may be calculated according to the first color channel value a and the second color channel value b of the reflected light measured at a single measurement position. It may be determined whether φ falls within the range of −N≤φ≤N. If the result is no, it may be determined that the color breakup of the reflected light measured at the single measurement position is unqualified; if the result is yes, it may be further determined whether φ is less than 0. If there is φ<0, the hue of the reflected light measured at the single measurement position is a cool color, which is qualified. Otherwise, the hue of the reflected light measured at the single measurement position is a warm color, which is unqualified.

In some embodiments of the present disclosure, generally, the color breakup and the hue of the reflected light by the display screen are quantitatively evaluated at a plurality of measurement positions, comprehensively. In this case, an average value $\varphi_{average}$ of the φ values calculated at the plurality of measurement positions may be determined. In practical applications, it is only needed to set a predetermined range for $\varphi_{average}$ to quantitatively control the color breakup and the hue of the display screen as a whole. A maximum value $\varphi_{max}$ may be determined from the $\varphi$ values calculated at the plurality of measurement positions. In practical applications, it is only needed to set a predetermined range for $\varphi_{max}$ to quantitatively control the color breakup and the hue of the display screen as a whole. The latter is applicable to a case that the color breakup and the hue are required to be quantitatively controlled relatively strictly.

Those skilled in the art may understand that, in the above two manners of comprehensively quantitatively evaluating the color breakup and the hue of the reflected light by the display screen measured at the plurality of measurement positions, the case of (a+b) equal to 0 is not considered, or is eliminated.

The following embodiments focus on how to measure the first color channel value a and the second color channel value b of the reflected light by the display screen in the Lab color space.

Figure 5:
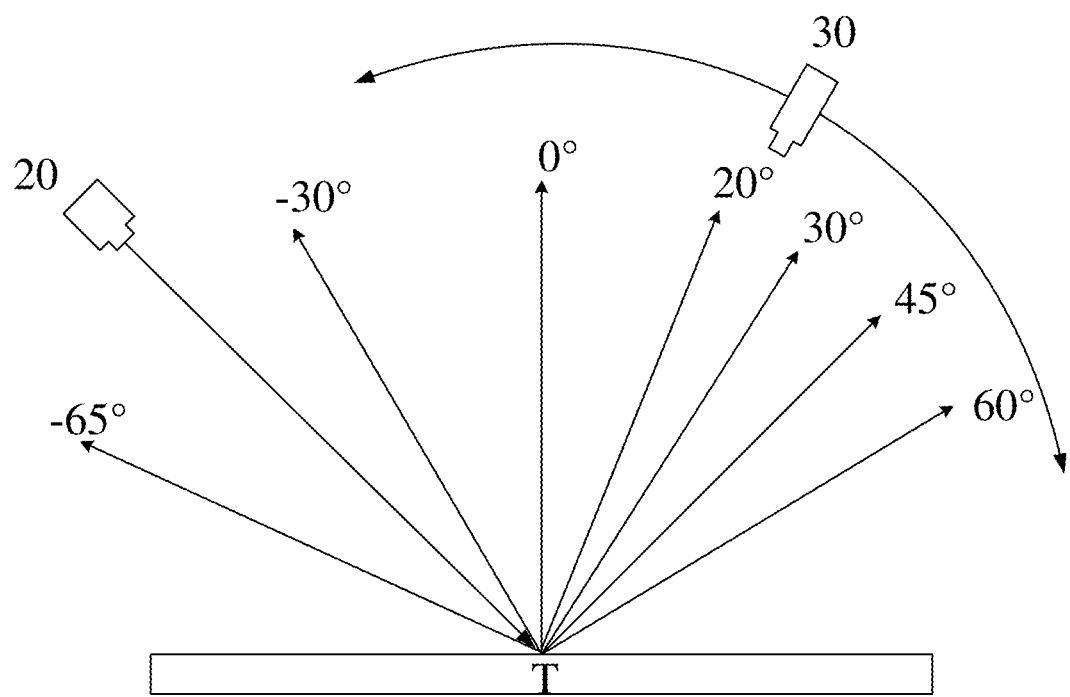
FIG. 5 shows a schematic scene diagram of measuring a value a and a value b of reflected light by a display screen in a Lab color space according to some embodiments of the present disclosure, where the display screen is irradiated with a point light source.

FIG. 5 shows a schematic scene diagram of measuring a value a and a value b of reflected light by a display screen in a Lab color space according to some embodiments of the present disclosure, where the display screen is irradiated with a point light source. As shown in FIG. 5, light emitted by a point light source 20 is incident on a test point T of the display screen to form a light spot. A diffuse reflection is formed at the test point, and the light is reflected towards various directions. The test point may be, for example, a center of the display screen. Those skilled in the art may understand that the test point may also be located at other positions on the display screen. The above-mentioned light spot generally covers a plurality of pixels. The point light source 20 is, for example, a standard C light source or a D65 light source. An incident angle of the light emitted from the point light source 20 onto the display screen is a predetermined angle, which may be, for example, 30° to 60°, and specifically may be, for example, 45°. A detector 30 may be rotated around the test point T in a plane perpendicular to the display screen, where the point light source and the test point T are both located in that plane. The detector 30 may be, for example, a multi-angle spectrophotometer or a colorimeter, which may directly measure the value a and the value b of the reflected light in the Lab color space.

In these embodiments, by rotating the detector 30 around the test point T in the above-mentioned plane, the first color channel values a and the second color channel values b of the reflected light may be measured at a plurality of measurement positions, that is, the first color channel values a and the second color channel values b of the reflected light may be measured from a plurality of measurement angles. Here, for ease of expression, a direction perpendicular to the display screen is defined as a 0° direction, a measurement angle is defined as an angle between an exit path of the reflected light measured at a measurement position and the direction perpendicular to the display screen, and the measurement angle is used to represent the corresponding measurement position. When the exit path of the reflected light measured at the measurement position is in a clockwise direction of the 0° direction, the measurement angle is of a positive value; when the exit path of the reflected light measured at the measurement position is in a counterclockwise direction of the 0° direction, the measurement angle is of a negative value. As shown in FIG. 5, by rotating the detector 30 around the test point T, the first color channel values a and the second color channel values b of the reflected light may be sequentially measured at a plurality of measurement angles. The plurality of measurement angles may be, for example, 60°, 45°, 30°, 20°, 0°, −30°, −65°, etc. Then, the color breakup value $l_{ab}=\sqrt{a^2+b^2}$ and the hue value $\varepsilon=|a+b|/(a+b)$ of the reflected light at each of the above-mentioned plurality of measurement angles may be calculated. Further, the color breakup and hue quantization value $\varphi$ of the reflected light measured at each of the above-mentioned plurality of measurement angles may be calculated.

In some embodiments, an average value $\varphi_{average}$ of the $\varphi$ values calculated at the plurality of measurement angles is calculated, and whether the display screen is qualified is determined based on determining whether the average value $\varphi_{average}$ is within a predetermined range, so that the color breakup and the hue of the display screen may be quantitatively controlled as a whole. In some embodiments, a maximum value $\varphi_{max}$ may be determined from the $\varphi$ values calculated at the plurality of measurement angles, and whether the display screen is qualified may be determined based on determining whether the maximum value $\varphi_{max}$ is within a predetermined range, so that the color breakup and the hue of the display screen may be quantitatively controlled as a whole.

In the above-mentioned embodiments, the quantitative evaluation of the color breakup and the hue of the reflected light is performed by irradiating the single test point using the point light source 20. In some other embodiments, in order to evaluate the color breakup and the hue of the reflected light by the display screen more accurately, a plurality of test points may be selected for the display screen to perform the quantitative evaluation of the color breakup and the hue of the reflected light. The number of test points may be, for example, 9 or more.

Figure 6:
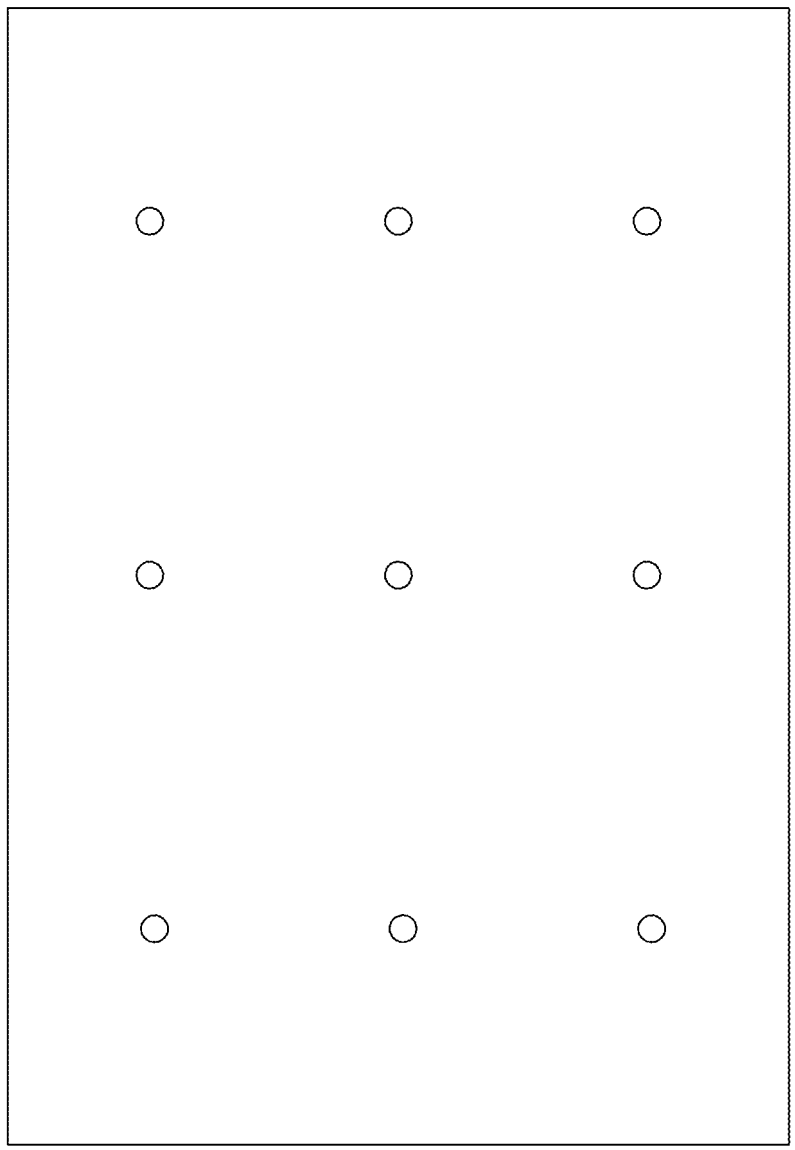
FIG. 6 shows a schematic top view of a plurality of test points distributed on a display screen according to some embodiments of the present disclosure.

FIG. 6 shows a schematic top view of a plurality of test points distributed on a display screen according to some embodiments of the present disclosure, where the plurality of test points are evenly distributed on the display screen. As shown in FIG. 6, 9 test points are provided. The 9 test points are arranged in a matrix, and a center of the matrix coincides with, for example, the center of the display screen. For each test point, the first color channel values a and the second color channel values b of the reflected light may be measured at a plurality of measurement angles as shown in FIG. 5. Specifically, in some embodiments, the incident angle of the light emitted from the point light source 20 onto the display screen is a predetermined angle, which may be, for example, 30° to 60°, and specifically may be, for example, 45°. First, a test point is irradiated with the point light source 20, and the detector 30 may be rotated around the test point in a plane perpendicular to the display screen, where the point light source 20 and the test point are both located in that plane. By rotating the detector 30 around the test point in the above-mentioned plane, the first color channel values a and the second color channel values b of the reflected light may be measured for the test point at a plurality of measurement angles. Then the point light source 20 may be translated with respect to the display screen, so that another test point is irradiated with the point light source. The first color channel values a and the second color channel values b of the reflected light may be measured for this other test point at a plurality of measurement angles in a similar manner. Next, the point light source 20 may continue to be translated with respect to the display screen, so that a next test point is irradiated with the point light source, and the first color channel values a and the second color channel values b of the reflected light may be measured at a plurality of measurement angles in the similar manner, until all test points are traversed. A corresponding (p value may be calculated for a first color channel value a and a second color channel value b measured each time.

In some embodiments, an average value $\varphi_{average}$ of the $\varphi$ values calculated at the plurality of measurement angles of the plurality of test points is calculated. It may be determined whether the display screen is qualified based on determining whether the average value $\varphi_{average}$ is within a predetermined range, so that the color breakup and the hue of the display screen may be quantitatively controlled as a whole. In some embodiments, a maximum value $\varphi_{max}$ is determined from the $\varphi$ values calculated at the plurality of measurement angles of the plurality of test points. It may be determined whether the display screen is qualified based on determining whether the maximum value $\varphi_{max}$ is within a predetermined range, so that the color breakup and the hue of the display screen may be quantitatively controlled as a whole.

In the above-mentioned embodiments, an orthographic projection of an incident path of the light, emitted from the point light source onto the display screen, on the display screen has a fixed intersection angle with respect to a length direction of the display screen. For example, the orthographic projection of the incident path of the light is parallel to, perpendicular to, or at a predetermined acute angle with the length direction L of the display screen.

In some other embodiments, in order to evaluate the color breakup and the hue of the reflected light by the display screen more accurately, for each of the plurality of test points of the display screen, the point light source may be moved with respect to the display screen, so that the orthographic projections of the incident paths of the light, which is emitted from the point light source onto the display screen, on the display screen may be at a plurality of angles with respect to the length direction of the display screen, and at each of the plurality of angles, the first color channel values a and the second color channel values b of the reflected light may be measured for the test point at a plurality of measurement angles.

By rotating the display screen with the test point as a center in a plane where the display screen is located, the point light source may be moved with respect to the display screen, so that the orthographic projections of the incident paths of the light, emitted from the point light source onto the display screen, on the display screen may be at a plurality of angles with respect to the length direction of the display screen.

Figure 7:
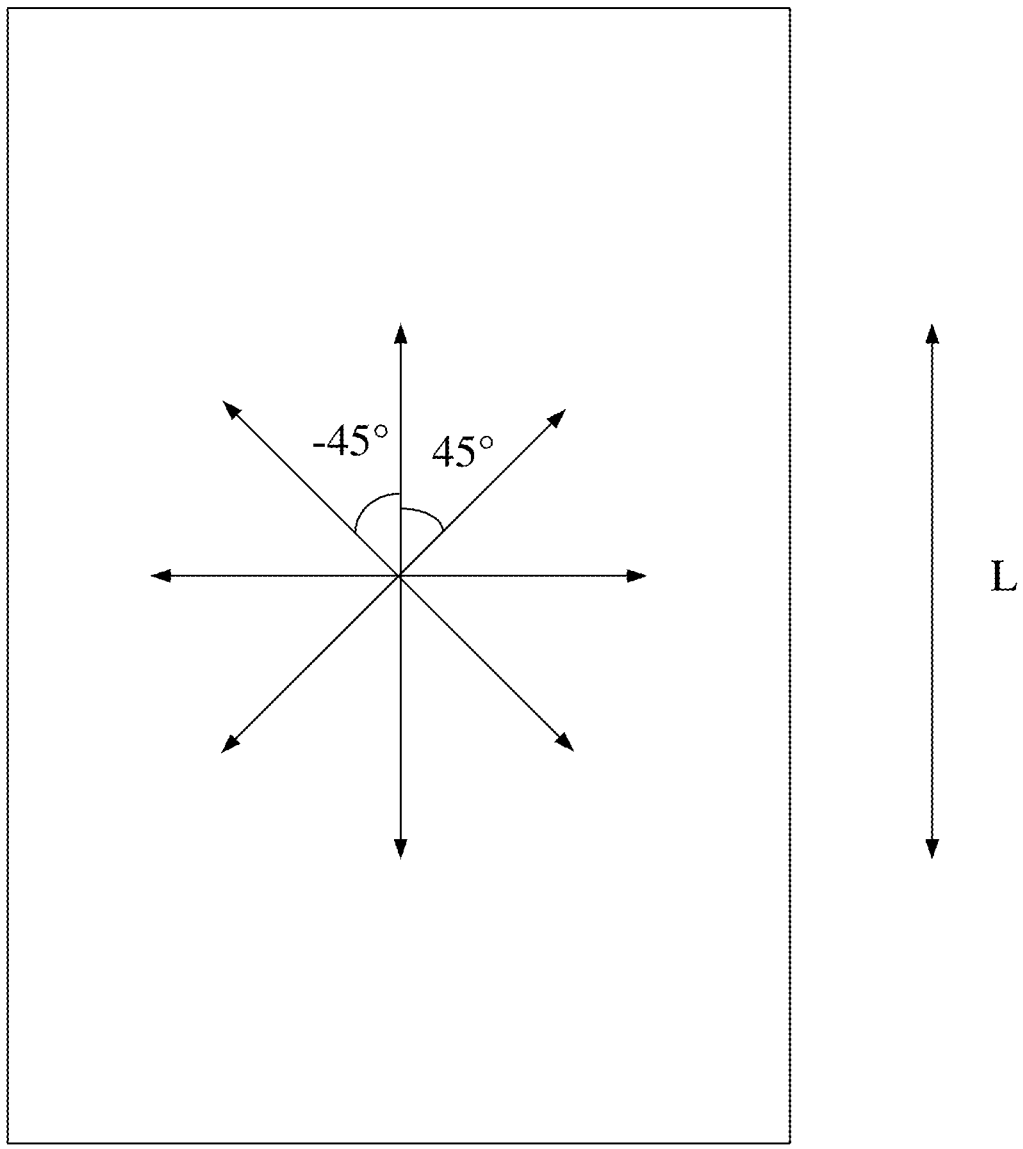
FIG. 7 shows that orthographic projections of incident paths of light, which is emitted to a display screen by a point light source, on the display screen are at a plurality of angles with respect to a length direction of the display screen.

FIG. 7 shows that orthographic projections of incident paths of light, which is emitted to the display screen by a point light source, on the display screen are at a plurality of angles with respect to a length direction of the display screen. As shown in FIG. 7, the orthographic projection of the incident path of the light, emitted onto the display screen by the point light source, on the display screen may be parallel to the length direction of the display screen, that is, the orthographic projection is at an angle of 0° or 180° with respect to the length direction L of the display screen. The orthographic projection of the incident path of the light, emitted onto the display screen by the point light source, on the display screen may also be perpendicular to the length direction of the display screen, that is, the orthographic projection is at an angle of 90° with respect to the length direction L of the display screen. The orthographic projection of the incident path of the light, emitted onto the display screen by the point light source, on the display screen may also form an acute angle, for example, ±45°, with the length direction L of the display screen.

For each test point, the first color channel value a and the second color channel value b of the reflected light may be measured at a plurality of measurement angles as shown in FIG. 5 for each of the plurality of angles formed between the orthographic projection of the incident path of the light, which is emitted to the display screen by the point light source, on the display screen and the length direction of the display screen.

Specifically, in some embodiments, the incident angle of the light emitted onto the display screen by the point light source 20 is a predetermined angle, which may be, for example, 30° to 60°, and specifically may be, for example, 45°. First, a test point is irradiated with the point light source 20, and the orthographic projection of the incident path of the light, emitted onto the display screen by the point light source 20, on the display screen is parallel to the length direction of the display screen. The detector 30 may be rotated around the test point in a plane perpendicular to the display, where the point light source 20 and the test point are both located in the plane. By rotating the detector 30 around the test point in the above-mentioned plane, the first color channel values a and the second color channel values b of the reflected light may be measured for the test point at a plurality of measurement angles. Then, the display screen may be rotated with the test point as a center in the plane where the display screen is located, so that the orthographic projection of the incident path of the light, emitted onto the display screen by the point light source 20, on the display screen is perpendicular to the length direction of the display screen, then the first color channel values a and the second color channel values b of the reflected light may be measured for the test point at a plurality of measurement angles, and the plurality of angles formed between the orthographic projection of the incident path of the light, emitted onto the display screen by the point light source 20, on the display screen and the length direction of the display screen are traversed in the above-mentioned manner. Next, the point light source 20 is moved with respect to the display screen, so that a next test point is irradiated with the point light source, and a similar method is adopted to traverse all test points. A corresponding $\varphi$ value may be calculated for a first color channel value a and a second color channel value b measured each time.

In some embodiments, when the orthographic projections of the incident paths of the light, emitted onto the display screen by the point light source 20, on the display screen are at a plurality of angles with respect to the length direction of the display screen, an average value $\varphi_{average}$ of the $\varphi$ values calculated at a plurality of measurement angles of a plurality of test points is calculated. Whether the display screen is qualified is determined based on determining whether the average value $\varphi_{average}$ is in a predetermined range, so that the color breakup and the hue of the display screen may be quantitatively controlled as a whole. In some embodiments, when the orthographic projections of the incident paths of the light, emitted onto the display screen by the point light source 20, on the display screen are at a plurality of angles with the length direction of the display screen, a maximum value $\varphi_{max}$ is determined from the $\varphi$ values calculated at the plurality of measurement angles of the plurality of test points. Whether the display screen is qualified is determined based on determining whether the maximum value $\varphi_{max}$ is in a predetermined range, so that the color breakup and the hue of the display screen may be quantitatively controlled as a whole.

Figure 8:
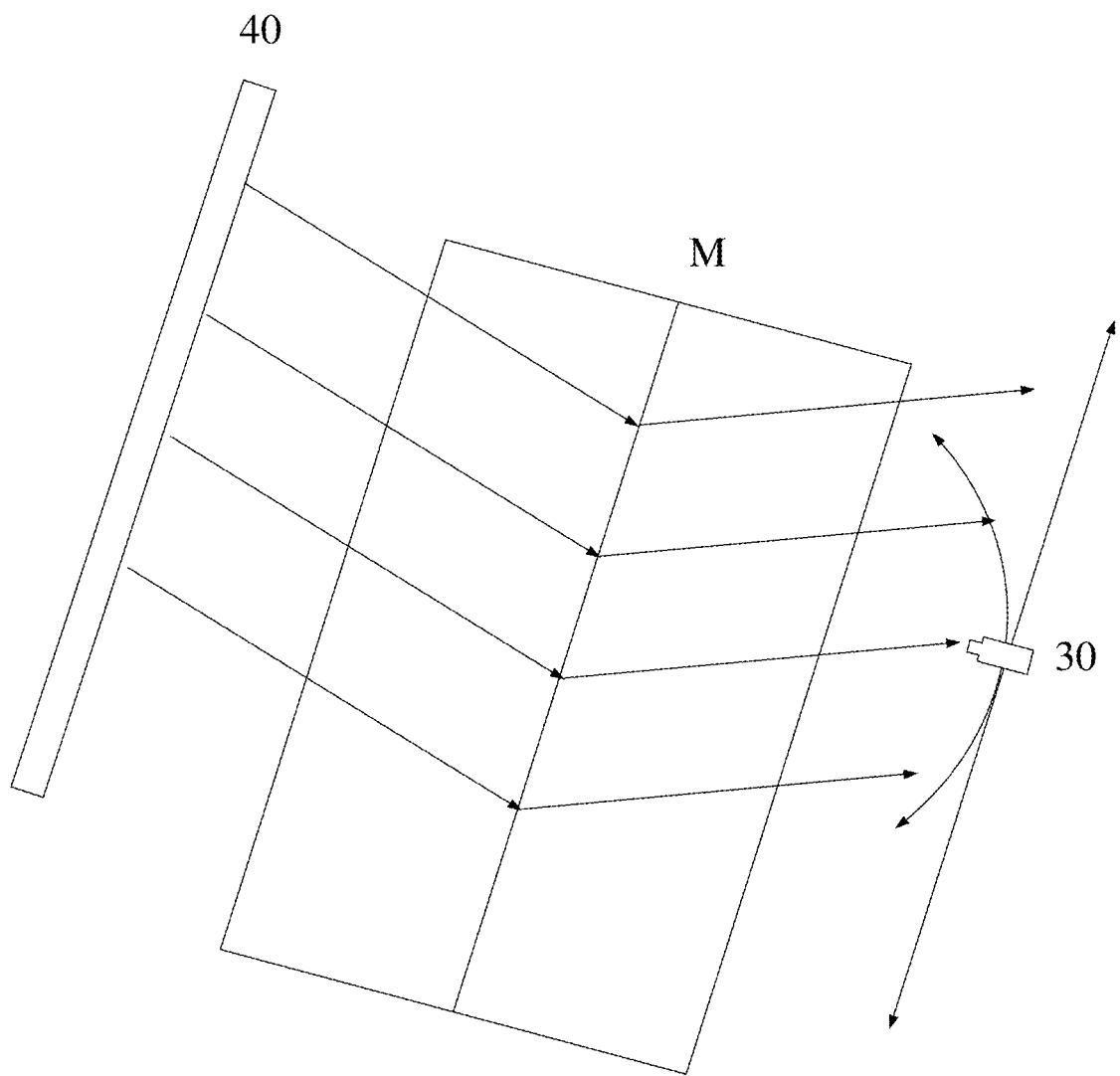
FIG. 8 shows a schematic scene diagram of measuring a value a and a value b of reflected light by a display screen in a Lab color space according to some embodiments of the present disclosure, where the display screen is irradiated with a line light source.

FIG. 8 shows a schematic scene diagram of measuring a value a and a value b of reflected light by a display screen in a Lab color space according to some embodiments of the present disclosure, where the display screen is irradiated with a line light source. As shown in FIG. 8, light emitted by a line light source 40 is incident on a test line M of the display screen to form a bright line, and the test line M is parallel to the line light source 40. A diffuse reflection is formed at the test line, and the light is reflected towards various directions. For example, the test line passes through a center of the display screen. Those skilled in the art may understand that the test line may also be located at other positions on the display screen. Generally, the bright line may cover a plurality of pixels in a width direction. The line light source 40 is, for example, a standard C light source or a D65 light source. An incident angle of the light from the line light source 40 incident on the display screen is a predetermined angle, which may be, for example, 30° to 60°, and specifically may be, for example, 45°. The test line M includes a plurality of test points. For each test point, the detector 30 may be rotated around the test line in a plane perpendicular to the test line M, where the test point is located in the plane. The detector 30 is, for example, a multi-angle spectrophotometer or a colorimeter, which may directly measure the value a and the value b of the reflected light in the Lab color space. For each test point, by rotating the detector 30 around the test line in the above-mentioned plane, the first color channel values a and the second color channel values b of the reflected light may be measured at a plurality of measurement angles in a manner similar to that shown in FIG. 5. As shown in FIG. 8, for the test line M, the detector may be moved in an extension direction of the test line M to traverse the test points on the test line M in sequence, so as to perform measurements at all the test points on the test line. A corresponding φ value may be calculated for a first color channel value a and a second color channel value b measured each time.

In some embodiments, an average value $\varphi_{average}$ of the φ values calculated at the plurality of measurement angles of the plurality of test points on the test line is calculated. Whether the display screen is qualified is determined based on determining whether the average value $\varphi_{average}$ is in a predetermined range, so that the color breakup and the hue of the display screen may be quantitatively controlled as a whole. In some embodiments, a maximum value $\varphi_{max}$ is determined from the φ values calculated at the plurality of measurement angles of the plurality of test points on the test line. Whether the display screen is qualified is determined based on determining whether the maximum value $\varphi_{max}$ is in a predetermined range, so that the color breakup and the hue of the display screen may be quantitatively controlled as a whole.

In the above-mentioned embodiments, the quantitative evaluation of the color breakup and the hue of the reflected light is performed by irradiating a single test line M using the line light source 40. In some other embodiments, in order to evaluate the color breakup and the hue of the reflected light by the display screen more accurately, a plurality of test lines may be selected for the display screen to perform the quantitative evaluation of the color breakup and the hue of the reflected light. The number of test lines may be, for example, 3 or more.

Figure 9:
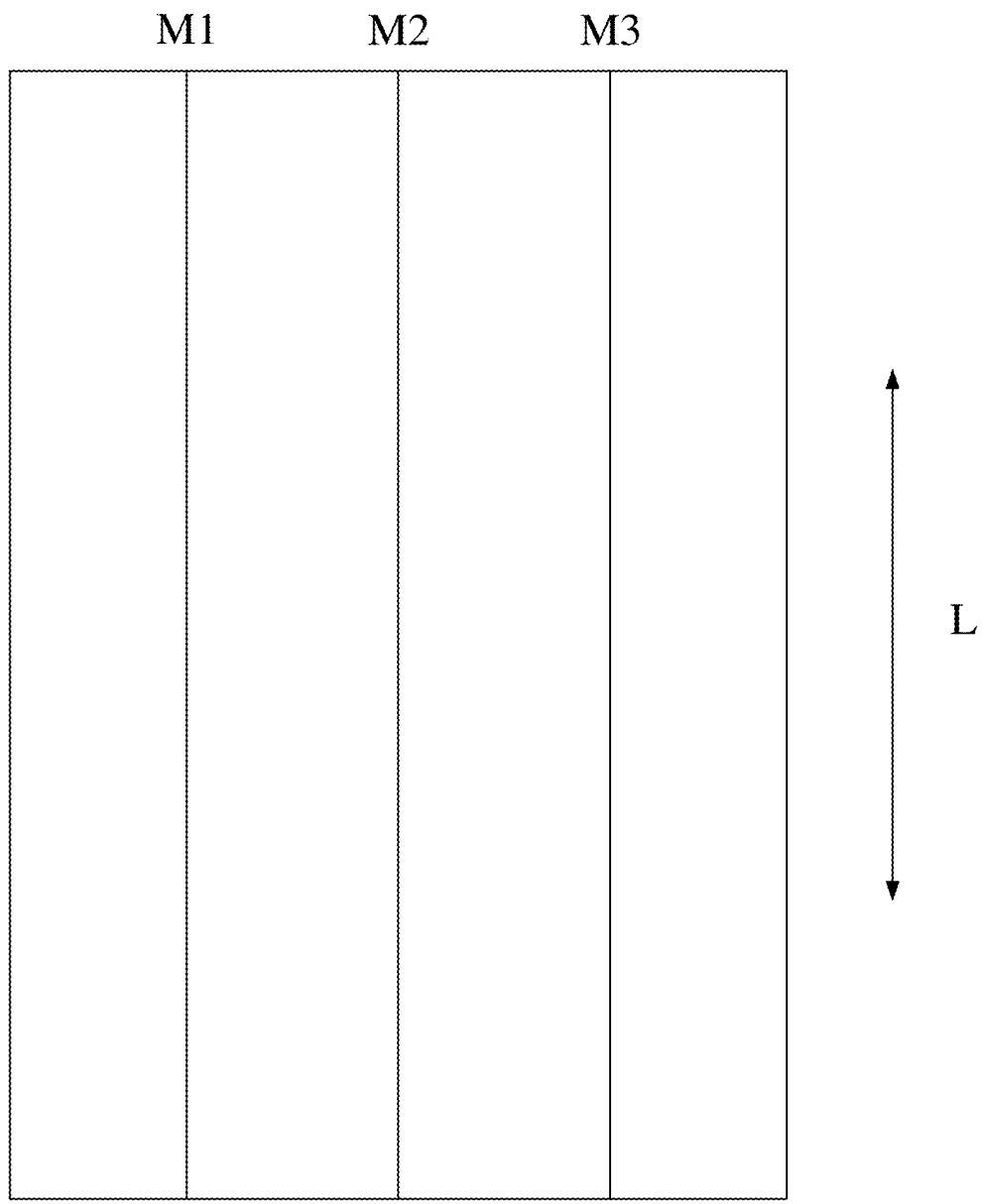
FIG. 9 shows a schematic top view of a plurality of test lines distributed on a display screen according to some embodiments of the present disclosure.

FIG. 9 shows a schematic top view of a plurality of test lines distributed on a display screen according to some embodiments of the present disclosure, where the plurality of test lines are evenly distributed and arranged in parallel to each other on the display screen. As shown in FIG. 9, for example, 3 test lines may be provided. The 3 test lines M1, M2 and M3 are distributed in parallel and are equally spaced, and the test line M2 in the middle passes through the center of the display screen. For each test point on each test line, the first color channel values a and the second color channel values b of the reflected light may be measured at a plurality of measurement angles by rotating the detector 30 around the test line in the above-mentioned plane in a manner similar to that shown in FIG. 5. For each test line, the detector may be moved in an extension direction of the test line to traverse the test points on the test line in sequence, so as to perform measurements for all the test points on the test line. A corresponding φ value may be calculated for a first color channel value a and a second color channel value b measured each time.

The 3 test lines shown in FIG. 9 are all parallel to the length direction L of the display screen. Those skilled in the art may understand that, in other embodiments, the three test lines may be all perpendicular to the length direction L of the display screen, or at a predetermined acute angle with respect to the length direction L of the display screen.

In some embodiments, an average value $\varphi_{average}$ of the φ values calculated at a plurality of measurement angles of the plurality of test points on the plurality of test lines is calculated. Whether the display screen is qualified is determined based on determining whether the average value $\varphi_{average}$ is in a predetermined range, so that the color breakup and the hue of the display screen may be quantitatively controlled as a whole. In some embodiments, a maximum value $\varphi_{max}$ is determined from the φ values calculated at the plurality of measurement angles of the plurality of test points on the plurality of test lines. Whether the display screen is qualified is determined based on determining whether the maximum value $\varphi_{max}$ is in a predetermined range, so that the color breakup and the hue of the display screen may be quantitatively controlled as a whole.

The 3 test lines shown in FIG. 9 are all parallel to the length direction L of the display screen. In order to evaluate the color breakup and the hue of the reflected light on the display screen more accurately, in other embodiments, one or more test lines perpendicular to the length direction L of the display screen may be added, and/or one or more test lines at a predetermined acute angle with respect to the length direction L of the display screen may be added. The predetermined acute angle is, for example, ±45°.

Figure 10:
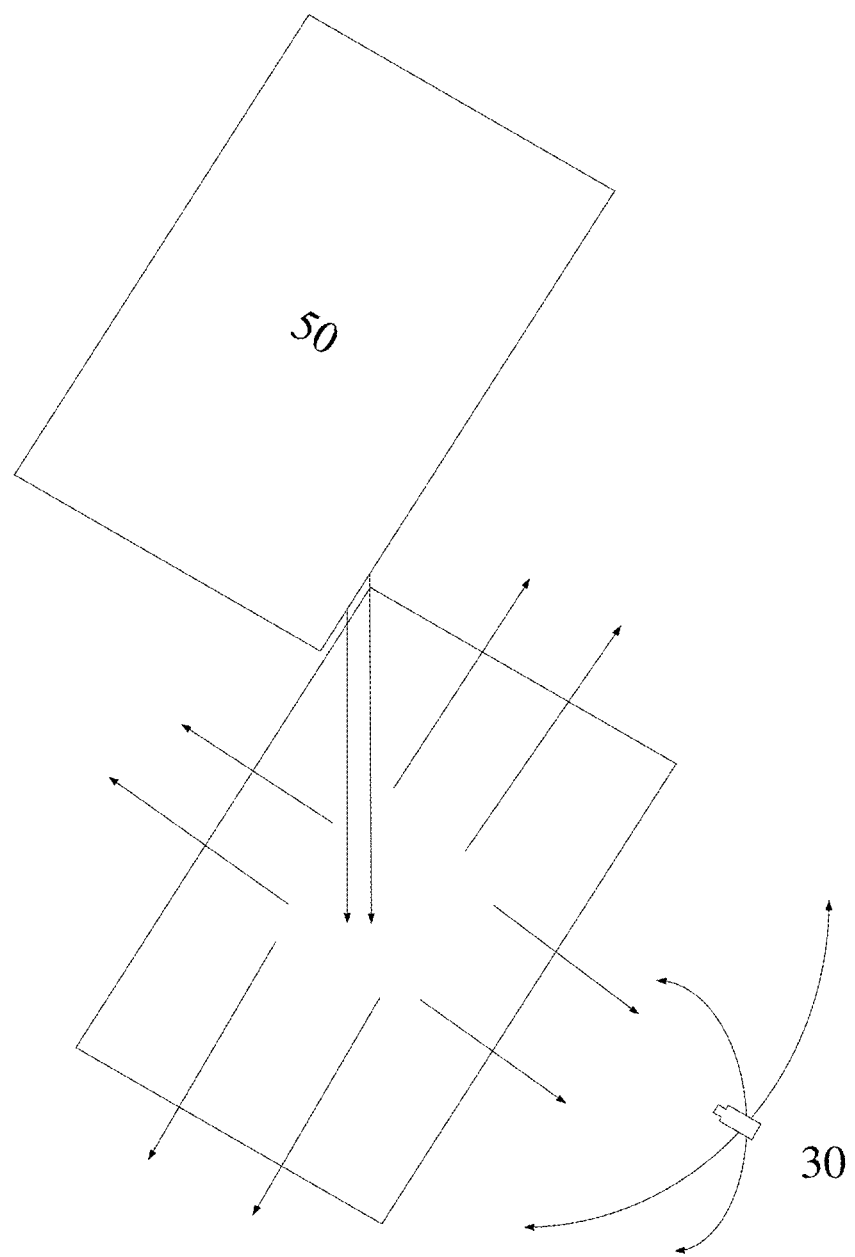
FIG. 10 shows a schematic scene diagram of measuring a value a and a value b of light reflected by a display screen in a Lab color space according to some embodiments of the present disclosure, where the display screen is irradiated with a surface light source.

FIG. 10 shows a schematic scene diagram of measuring a value a and a value b of reflected light by a display screen in a Lab color space according to some embodiments of the present disclosure, where the display screen is irradiated with a surface light source. As shown in FIG. 10, a surface light source 50 is arranged parallel to the display screen, and an orthographic projection of a center of the surface light source 50 on the display screen coincides with the center of the display screen. The light emitted by the surface light source 50 is vertically incident to the screen and the entire screen is illuminated. The light incident to the display screen forms a diffuse reflection on the surface of the display screen, and the light is reflected towards various directions. The surface light source 50 is, for example, a standard C light source or a D65 light source. The detector 30 may be rotated around a line passing through the center of the display screen and perpendicular to the display screen in a plane parallel to the display screen. At each of a plurality of rotation angles of the detector 30, the first color channel values a and the second color channel values b of the reflected light may be measured at a plurality of measurement angles by rotating the detector 30 around the test line in a plane perpendicular to the display screen and passing through the center of the display screen, which is similar to the manner shown in FIG. 5. It may be understood that the detector 30 performs measurements at a plurality of measurement positions, where the measurement positions are distributed on a hemisphere which protrudes toward the surface light source 50 and centered on the center of the display screen, and the first color channel value a and the second color channel value b of the reflected light are measured by the detector at each measurement position. The corresponding φ value may be calculated for a first color channel value a and a second color channel value b measured each time.

In some embodiments, an average value $\varphi_{average}$ of the φ values calculated at a plurality of measurement positions is calculated. Whether the display screen is qualified is determined based on determining whether the average value $\varphi_{average}$ is in a predetermined range, so that the color breakup and the hue of the display screen may be quantitatively controlled as a whole. In some embodiments, a maximum value $\varphi_{max}$ is determined from the φ values calculated at a plurality of measurement positions. Whether the display screen is qualified is determined based on determining whether the maximum value $\varphi_{max}$ is in a predetermined range, so that the color breakup and the hue of the display screen may be quantitatively controlled as a whole.

Figure 11:
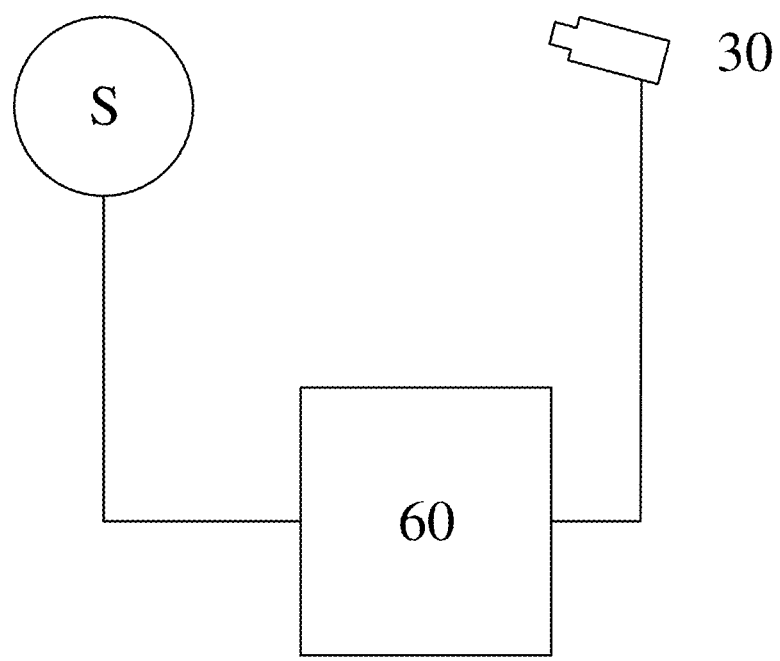
FIG. 11 shows a structural block diagram of a device for detecting a display screen according to some embodiments of the present disclosure.

Some embodiments of the present disclosure provide a device for detecting a display screen. FIG. 11 shows a structural block diagram of a device for detecting a display screen according to some embodiments of the present disclosure. As shown in FIG. 11, the device for detecting the display screen includes: a light source S, a detector 30, and a processor 60. The light source S may be, for example, the point light source 20, the line light source 40, or the surface light source 50 as described above, which is configured to emit light onto the surface of the display screen to form a diffuse reflection. The detector 30 is configured to measure a first color channel value a and a second color channel value b of the reflected light. The processor 60 is configured to execute the steps of the detection method described in the foregoing embodiments, for example, specifically to execute steps S10 to S50 shown in FIG. 2.

Some embodiments of the present disclosure further provide a system for detecting a display screen, including a detection device and a display screen. The detection device is, for example, the detection device shown in FIG. 11, and the display screen is, for example, the OLED display panel shown in FIG. 1.

The above descriptions are merely preferred embodiments of the present disclosure and explanations of the technical principles applied. Those skilled in the art should understand that the scope of the invention involved in the present disclosure is not limited to the technical solutions formed by the specific combination of the above technical features, and should also cover other technical solutions formed by any combination of the above technical features or their equivalent features without departing from the inventive concept, for example, the technical features formed by mutual replacements of the above-mentioned features and the technical features with similar functions disclosed in the present disclosure (but not limited thereto).

What is claimed is:

1. A method for detecting a display screen, comprising:
   emitting, by a light source, light onto a surface of a display screen to form a diffuse reflection, wherein the light source comprises an initial first color channel value a1 and an initial second color channel value b1;
   measuring, by a detector, a first color channel value a and a second color channel value b of the reflected light;
   calculating a color breakup value lab of the reflected light by: $l_{ab}=\sqrt{(a-a1)^2+(b-b1)^2}$;
   calculating, in response to (a+b) being not equal to 0, a hue value ε by: ε=|a+b|/(a+b);
   calculating a color breakup and hue quantization value φ of the reflected light by: $\varphi=l_{ab}\times\varepsilon=|a+b|/\sqrt{(a-a1)^2+(b-b1)^2}/(a+b)$; and
   determining whether the display screen is qualified based on determining whether the color breakup and hue quantization value q is within a predetermined quantization value range.

2. The detection method according to claim 1, further comprising:
   determining, in response to (a+b) being equal to 0, whether the display screen is qualified based on determining whether the color breakup value $l_{ab}$ of the reflected light is within a predetermined color breakup value range.

3. The detection method according to claim 1, wherein the calculating a color breakup and hue quantization value φ of the reflected light comprises calculating a plurality of color breakup and hue quantization values φ,
   the detection method further comprises: calculating an average value $\varphi_{average}$ of the plurality of color breakup and hue quantization values φ, and
   the determining whether the display screen is qualified based on determining whether the color breakup and hue quantization value φ is within a predetermined quantization value range comprises: determining whether the display screen is qualified based on determining whether the average value $\varphi_{average}$ is within the predetermined quantization value range.

4. The detection method according to claim 3, wherein the light source is a point light source, and the display screen comprises at least one test point located on the surface of the display screen;
   emitting, by the light source, light onto the surface of the display screen comprises: emitting, by the point light source, light onto the at least one test point;
   measuring, by the detector, the first color channel value a and the second color channel value b of the reflected light comprises:
   for each test point, rotating the detector around the test point in a plane perpendicular to the display screen, so as to obtain a plurality of measurement positions, wherein the point light source and the test point are located in the plane; and
   obtaining, by the detector, the first color channel values a and the second color channel values b of the reflected light at the plurality of measurement positions, respectively,
   calculating the plurality of color breakup and hue quantization values φ comprises: respectively calculating the color breakup and hue quantization values φ for the first color channel values a and the second color channel values b of the reflected light at the plurality of measurement positions, so as to obtain the plurality of color breakup and hue quantization values φ.

5. The detection method according to claim 4, wherein the light emitted by the point light source is incident on the display screen at an incident angle of 30° to 60°.

6. The detection method according to claim 4, wherein the at least one test point comprises a plurality of test points distributed in a matrix, and a center of the matrix coincides with a center of the display screen.

7. The detection method according to claim 4, wherein an orthographic projection of an incident path of the light emitted by the point light source to the display screen on the display screen is parallel to, perpendicular to, or at a predetermined acute angle with respect to a length direction of the display screen.

8. The detection method according to claim 3, wherein the light source is a line light source parallel to the display screen, the display screen comprises at least one test line on the surface of the display screen, and each test line comprises a plurality of test points;
    emitting, by the light source, light onto the surface of a display screen comprises: emitting, by the line light source, light onto the at least one test line;
    measuring, by the detector, the first color channel value a and a second color channel value b of the reflected light comprises:
    for each test line, moving the detector in a direction parallel to an extension direction of the test line; and for each test point on each test line, rotating the detector around the test point in a plane perpendicular to the test line comprising the test point, so as to obtain a plurality of measurement positions, wherein the test point is located in the plane; and
    obtaining, by the detector, the first color channel values a and the second color channel values b of the reflected light at the plurality of measurement positions, respectively,
    calculating the plurality of color breakup and hue quantization values $\varphi$ comprises: respectively calculating the color breakup and hue quantization values $\varphi$ for the first color channel values a and the second color channel values b of the reflected light at the plurality of measurement positions, so as to obtain the plurality of color breakup and hue quantization values $\varphi$.

9. The detection method according to claim 8, wherein the light emitted by the line light source is incident on the display screen at an incident angle of 30° to 60°.

10. The detection method according to claim 8, wherein the at least one test line comprises a plurality of test lines parallel to each other and distributed evenly on the display screen.

11. The detection method according to claim 8, wherein the test line is parallel to, perpendicular to, or at a predetermined acute angle with respect to a length direction of the display screen.

12. The detection method according to claim 3, wherein the light source is a surface light source parallel to the display screen, and an orthographic projection of a center of the surface light source on the display screen coincides with a center of the surface of the display screen;
    emitting, by the light source, light onto the surface of the display screen comprises: emitting, by the surface light source, light onto an entire surface of the display screen;
    measuring, by the detector, the first color channel value a and the second color channel value b of the reflected light comprises:
    rotating the detector around a straight line connecting the center of the surface light source and the center of the surface of the display screen in a plane parallel to the surface of the display screen, so as to obtain a plurality of rotation positions; and for each rotation position, rotating the detector around the center of the surface of the display screen in a plane perpendicular to the display screen, so as to obtain a plurality of measurement positions, wherein the rotation position and the center of the surface of the display screen are located in the plane perpendicular to the display screen; and
    obtaining, by the detector, the first color channel values a and the second color channel values b of the reflected light at the plurality of measurement positions, respectively,
    calculating the plurality of color breakup and hue quantization values $\varphi$ comprises: respectively calculating the color breakup and hue quantization values $\varphi$ for the first color channel values a and the second color channel values b of the reflected light at the plurality of measurement positions, so as to obtain the plurality of color breakup and hue quantization values $\varphi$.

13. The detection method according to claim 1, wherein the calculating a color breakup and hue quantization value $\varphi$ of the reflected light comprises calculating a plurality of color breakup and hue quantization values $\varphi$,
    the detection method further comprises: determining a maximum value $\varphi_{max}$ from the plurality of color breakup and hue quantization values $\varphi$, and
    the determining whether the display screen is qualified based on determining whether the color breakup and hue quantization value $\varphi$ is within a predetermined quantization value range comprises: determining whether the display screen is qualified based on determining whether the maximum value $\varphi_{max}$ is within the predetermined quantization value range.

14. The detection method according to claim 13, wherein the light source is a point light source, and the display screen comprises at least one test point located on the surface of the display screen;
    emitting, by the light source, light onto the surface of the display screen comprises: emitting, by the point light source, light onto the at least one test point;
    measuring, by the detector, the first color channel value a and the second color channel value b of the reflected light comprises:
    for each test point, rotating the detector around the test point in a plane perpendicular to the display screen, so as to obtain a plurality of measurement positions, wherein the point light source and the test point are located in the plane; and
    obtaining, by the detector, the first color channel values a and the second color channel values b of the reflected light at the plurality of measurement positions, respectively,
    calculating the plurality of color breakup and hue quantization values $\varphi$ comprises: respectively calculating the color breakup and hue quantization values $\varphi$ for the first color channel values a and the second color channel values b of the reflected light at the plurality of measurement positions, so as to obtain the plurality of color breakup and hue quantization values $\varphi$.

15. The detection method according to claim 13, wherein the light source is a line light source parallel to the display screen, the display screen comprises at least one test line on the surface of the display screen, and each test line comprises a plurality of test points;
    emitting, by the light source, light onto the surface of the display screen comprises: emitting, by the line light source, light onto the at least one test line;
    measuring, by the detector, the first color channel value a and the second color channel value b of the reflected light comprises:

for each test line, moving the detector in a direction parallel to an extension direction of the test line; and for each test point on each test line, rotating the detector around the test point in a plane perpendicular to the test line comprising the test point, so as to obtain a plurality of measurement positions, wherein the test point is located in the plane; and obtaining, by the detector, the first color channel values a and the second color channel values b of the reflected light at the plurality of measurement positions, respectively, the calculating a plurality of color breakup and hue quantization values $\varphi$ comprises: respectively calculating the color breakup and hue quantization values $\varphi$ for the first color channel values a and the second color channel values b of the reflected light at the plurality of measurement positions, so as to obtain the plurality of color breakup and hue quantization values $\varphi$.

16. The detection method according to claim 13, wherein the light source is a surface light source parallel to the display screen, and an orthographic projection of a center of the surface light source on the display screen coincides with a center of the surface of the display screen;

emitting, by the light source, light onto the surface of the display screen comprises: emitting, by the surface light source, light onto an entire surface of the display screen;

measuring, by the detector, the first color channel value a and the second color channel value b of the reflected light comprises:

rotating the detector around a straight line connecting the center of the surface light source and the center of the surface of the display screen in a plane parallel to the surface of the display screen, so as to obtain a plurality of rotation positions; and for each rotation position, rotating the detector around the center of the surface of the display screen in a plane perpendicular to the display screen, so as to obtain a plurality of measurement positions, wherein the rotation position and the center of the surface of the display screen are located in the plane perpendicular to the display screen; and obtaining, by the detector, the first color channel values a and the second color channel values b of the reflected light at the plurality of measurement positions, respectively, calculating the plurality of color breakup and hue quantization values $\varphi$ comprises: respectively calculating the color breakup and hue quantization values $\varphi$ for the first color channel values a and the second color channel values b of the reflected light at the plurality of measurement positions, so as to obtain the plurality of color breakup and hue quantization values $\varphi$.

17. The detection method according to claim 1, wherein the light source is a mixed-color light source comprising at least two different colors.

18. The detection method according to claim 17, wherein the light source is a white light source.

19. A device for detecting a display screen, comprising:
a light source configured to emit light onto a surface of a display screen to form a diffuse reflection, wherein the light source comprises an initial first color channel value a1 and an initial second color channel value b1;
a detector configured to measure a first color channel value a and a second color channel value b of the reflected light; and
a processor configured to:
calculate a color breakup value lab of the reflected light by: $l_{ab}=\sqrt{(a-a1)^2+(b-b1)^2}$;
calculate, in response to (a+b) being not equal to 0, a hue value $\varepsilon$ by: $\varepsilon=|a+b|/(a+b)$;
calculate a color breakup and hue quantization value $\varphi$ of the reflected light by: $\varphi=l_{ab}\times\varepsilon=|a+b|\sqrt{(a-a1)^2+(b-b1)^2}/(a+b)$; and
determine whether the display screen is qualified based on determining whether the color breakup and hue quantization value $\varphi$ is within a predetermined quantization value range.

20. A system for detecting a display screen, comprising the detection device according to claim 19 and a display screen, wherein the display screen comprises an OLED display panel, and the OLED display panel comprises:
a substrate;
a plurality of pixels arranged in an array on the substrate;
an encapsulation layer located on a side of the plurality of pixels away from the substrate and covering the plurality of pixels; and
a color film layer arranged on a side of the encapsulation layer away from the plurality of pixels.

* * * * *